United States Patent [19]

Parrish

[11] Patent Number: 4,871,195

[45] Date of Patent: Oct. 3, 1989

[54] SAFE LOCKING QUICK DISCONNECT COUPLING

[75] Inventor: James R. Parrish, Enid, Okla.

[73] Assignee: Central Machine and Tool Company, Enid, Okla.

[21] Appl. No.: 248,624

[22] Filed: Sep. 26, 1988

[51] Int. Cl.[4] ............................................. F16L 55/00
[52] U.S. Cl. ....................................... 285/91; 285/93; 285/312
[58] Field of Search ................. 285/91, 312, 313, 305, 285/404, 924, 93; 411/200

[56] References Cited

U.S. PATENT DOCUMENTS

| 3,527,485 | 9/1970 | Goward et al. | 285/305 X |
| 3,584,902 | 6/1971 | Vyse | 285/924 X |
| 4,295,670 | 10/1981 | Goodall et al. | 285/91 |

FOREIGN PATENT DOCUMENTS 1569471 5/1969 France ............................ 411/200

Primary Examiner—Dave W. Arola
Attorney, Agent, or Firm—Laney, Dougherty, Hessin & Beavers

[57] ABSTRACT

A quick disconnect coupling which includes a tubular male plug defining a groove in the exterior surface thereof. The plug is received in a socket which defines apertures on its opposite sides. These apertures are aligned with the groove in the plug when the plug is sealingly seated in the socket. Two lever arms are pivotally connected to opposite sides of the socket. Each has an elongated handle portion, and a pivot head pivotally connected to said socket adjacent one of the apertures. A cam portion on each pivot head projects through the adjacent socket aperture into camming engagement with the groove. Two pairs of lugs are mounted on opposite sides of the socket with each pair defining aligned pin holes. The lugs in each pair are positioned on opposite sides of one of the handles when the lever arms are in their locking positions. A locking pin is provided having a first straight leg extending through the aligned lug pin holes, and further having a bent angulated leg of generally W-shaped configuration. The straight and angulated legs are joined through a finger grip section.

1 Claim, 2 Drawing Sheets

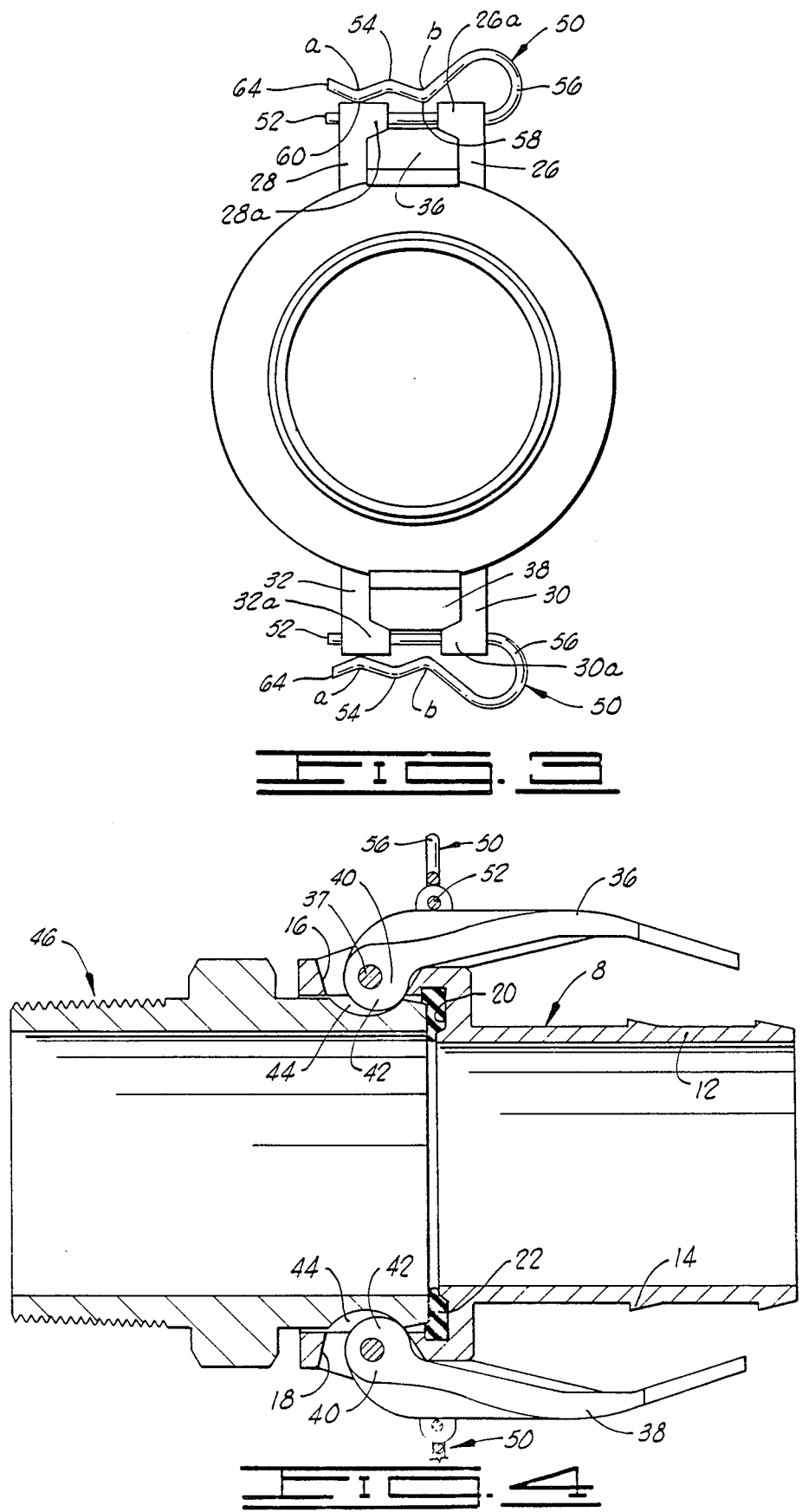

SAFE LOCKING QUICK DISCONNECT COUPLING

FIELD OF THE INVENTION

This invention relates to quick disconnect couplings used to interconnect the ends of conduits employed in high pressure fluid service so that the conduit ends can be quickly, easily and safely connected and disconnected.

BACKGROUND OF THE INVENTION Brief Description of the Prior Art

Several types of quick disconnect couplings for interconnecting the ends of conduits and pipelines used for conveying fluids under pressure from one point to another have previously been commercially available. One such high pressure quick release coupling system is that which is illustrated and described in U.S. Pat. No. 4,295,670.

In this system, a female adapter or socket has a pair of openings or apertures on opposite sides thereof, and an internal seat adapted to sealingly cooperate with one end of a male plug inserted in the adapter. There is provided, for retaining the male plug within the female socket, a pair of elongated lever subassemblies which are pivotally secured to opposite sides of the female socket. Each of these lever subassemblies include an elongated handle and a pivot head pivotally secured to the female socket adjacent one of the two openings on opposite sides thereof. Each pivot head which is pivotally secured to the socket adjacent one of the openings carries a cam face which projects through the opening in the socket and into a cooperating relationship with the annular groove formed around the male plug inserted in the female socket. When the elongated handle included in each of the two lever arm subassemblies is pivoted to a locking position, the cam surface carried on the pivot head biases the male plug into sealing engagement with the female socket.

For the purpose of locking the handles in their locking positions in which they bias the male plug into sealing engagement with the female socket, a pair of locking pins are provided which, in cooperation with two pairs of locking lugs, extend across the respective handles of the lever subassemblies to prevent the handles from being inadvertently pivoted outwardly, thus causing the cam surface to function to disengage the male plug from the female socket and thus allow disconnection of the coupling. The locking pins thus employed are generally of U-shaped configuration with each having a straight leg which extends between a pair of apertured lugs disposed on opposite sides of each of the respective handles.

BRIEF DESCRIPTION OF THE PRESENT INVENTION

The present invention comprises a quick disconnect coupling which is similar in several respects to that which is described in U.S. Pat. No. 4,295,670. Thus, the coupling includes a female socket which receives a male plug and is sealing engaged with the male plug when the coupling is in a fully connected status. The coupling further includes a pair of lever arms pivotally mounted on opposite sides of the female socket and pivotally secured thereto for pivotation between a locking position and a released position. The lever arms carry, at the ends pivotally connected to the female socket, a pair of cam portions which project through opposed openings formed through the female socket so as to be positioned to engage a groove formed on the male plug when the plug is inserted in the female socket.

The lever arms are retained in a locking status by a pair of U-shaped locking pins which extend between pairs of lugs which project radially outwardly from the sides of the female socket. The lugs in each pair are located on opposite sides of handle portions of the lever arms, which handle portions lie alongside the female socket when the lever arms are in a locking status. The locking pins cross the upper sides of the handle portions of the lever arms, and are retained in this position by means of angulated bends formed in one of the legs of the locking pins. These bends engage portions of the locking lugs which extend outwardly from the female socket portion on opposite sides of the lever arm handle portions.

An important object of the present invention is to provide an improved quick release coupling in which the lever arms, which are pivotally secured to the female socket for the purpose of retaining the male plug locked in an engaged position can be prevented from inadvertent release. This is accomplished by a pair of locking pins used to prevent the lever arms from inadvertently undergoing pivotation from a locked or coupled status to an unlocked or uncoupled status.

Another object of the invention is to provide improved locking pins for use in a quick disconnect coupling of the type which employs a female socket, a male plug and a pair of lever arms to bias the male socket into a sealing relationship with the female socket.

Additional objects and advantages of the invention will become apparent as the following detailed description of the invention is read in conjunction with the accompanying drawings which illustrate a preferred embodiment of the invention.

GENERAL DESCRIPTION OF THE DRAWINGS

FIG. 3 is a rear elevation view of the female socket portion of the quick disconnect coupling of the invention.

FIG. 4 is a sectional view of the coupling depicted in FIGS. 1-3, showing the male plug inserted in the female socket portion, and lockingly engaged therewith.

DETAILED DESCRIPTION OF A PREFERRED EMBODIMENT OF THE INVENTION

Figure 1:
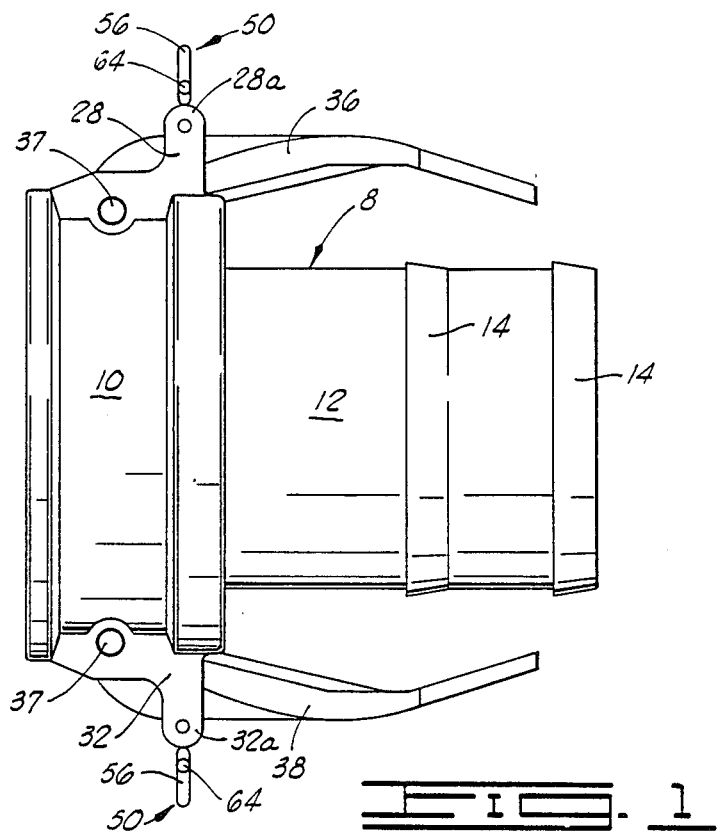
FIG. 1 is a side elevation view of the female socket portion of a quick disconnect coupling constructed in accordance with the present invention.

Referring initially to FIG. 1 of the drawings, the socket of the detachable coupling of the invention is there illustrated. The socket is denominated generally by reference numeral 8 and includes a cylindrical collar 10 which has projecting coaxially therefrom, a tubular neck 12 which carries a plurality of axially spaced annular engagement ribs 14. The annular engagement ribs 14 function to frictionally engage and retain a resilient tube or the like which is to be engaged with a second tube or tubular section (not shown).

The cylindrical collar 10 has formed therein on the opposite sides thereof, a pair of radial apertures or openings 16 and 18. The cylindrical collar 10 is of a larger diameter than the tubular neck 12, so that an axially facing shoulder 20 is formed at the intersection of the collar and neck. The shoulder 20 forms a seat for an annular gasket or seal 22 which faces toward the open end of the cylindrical collar 10.

Two pairs of protuberant lugs are located on the opposite sides of the socket 8 in position such that the two lugs in each of the pairs straddle, or are disposed on opposite sides of, one of the openings 16 or 18. As shown in FIGS. 1 and 3, the lugs in the first pair of lugs are denominated generally by reference numerals 26 and 28, and the lugs in the second pair of lugs are denominated generally by reference numerals 30 and 32. Each of the lugs is characterized in having a radially outwardly projecting ear, with the ears of the several lugs being denominated by the respective reference numerals 26a, 28a, 30a and 32a. The ear portion of each of the lugs in these pairs is provided with a pin hole 33 and the pin holes 33 in the lug ears in each pair of lugs are aligned. The holes 33 are aligned along a line which lies in a plane which extends perpendicular to the axis of the socket 8.

Figure 2:
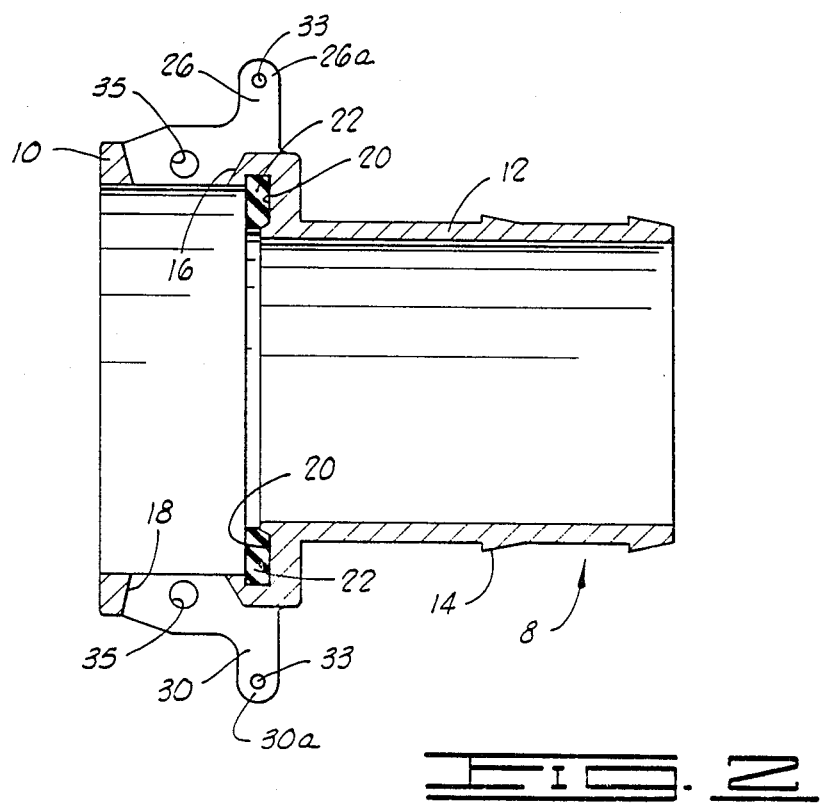
FIG. 2 is a sectional view taken along the longitudinal centerline of the female socket shown in FIG. 1, and illustrating the construction of the socket, and particularly, of locking lugs formed on, and projecting from, opposite sides of the socket.

It will also be noted, in referring to FIGS. 1 and 2, that each of the lugs 26 and 28, and 30 and 32 adjacent the respective openings 16 and 18 carries a pivot shaft aperture 35 which provides a means for pivotally connecting to the socket by the use of a pivot shaft 37, two lever arms denominated generally by reference numerals 36 and 38. Each of the lever arms 36 and 38 includes a pivot head 40 which has at the inner side thereof, and projecting through the respective aperture or opening 16 or 18, a cam portion or cam lobe 42. The cam lobe 42 projects through the respective aperture or opening 16 or 18 into operative engagement with an annular groove 44 formed around a male projection or plug 46 of the sort illustrated in FIG. 4. The male plug 46 having the annular groove 44 formed therearound is telescopingly inserted into the socket 8 and, when the coupling is engaged for high pressure fluid service, bears against the resilient annular seal 22 which is seated against the axially facing radial shoulder 20.

For the purpose of locking the lever arms 36 and 38 against inadvertent release which would uncouple the coupling unintentionally, a pair of locking pins 50 are provided and are positioned, in their operative status, at the locations best illustrated in FIGS. 1 and 3. Each locking pin 50 includes a straight first leg 52 and an angulated second leg 54. The legs 52 and 54 are joined through a semicircular finger gripping loop portion 56.

The angulated leg 54 of the locking pin 50 defines a pair of contiguous obtuse angles which are formed in this leg in immediate proximity to each other so that the leg has a generally "open W" configuration. The two obtuse angles to which reference is made are denominated by reference numerals "a" and "b" in FIG. 3. The angulated leg 54 is continuously resiliently urged toward the straight first leg 52. It will be noted in referring to FIG. 3 that the angulated leg 54 includes two points on the opposite sides of the angles "a" and "b" which are the closest points on the angulated leg to the straight leg 52. These points, denominated by reference numerals 58 and 60, are positioned so as to consecutively engage the inwardly facing abutment faces of each of the ear portions of the respective lugs 26 and 30.

It will further be noted that the angulated leg 54 includes, adjacent its free end 64, an end portion which extends in a direction away from the straight leg 52. This configuration allows the angulated leg 54 to be biased or pryed outwardly away from the straight leg 52 by the action of the ear portions of the lugs forced between the legs at a time when the locking pin 50 is inserted in its locking position.

The coupled status of the female socket and the male adapter plug 46 when the two are coupled to afford a fluid-tight connection is illustrated in FIG. 4. It will be noted that the pins 50 have the straight leg portions 52 thereof extended across the upper side of the lever arms 36 and 38 so as to prevent the lever arms from being inadvertently pivoted outwardly to release the coupling. This status is maintained by the angulation of the angulated leg 54 of the pin which prevents these pins from being easily inadvertently removed. It will be perceived as reference is made to FIG. 3 that in order for the pin 50 to be removed, there will be two points of increased resistance encountered as it is attempted to extract the pin by pulling on the loop portion 6. In the first of these, the point or protuberant portion 58 will strike the ear 26a of the lug 26. In the second, the point 60 will also strike the ear portion 26a of the lug 26. Only after both of these points of resistance have been overcome during extraction of the pin can the pin then be extricated so as to completely free the handle.

From the foregoing description of the invention, it will be perceived that the present invention provides an improved quick disconnect coupling which can be safely used without fear of inadvertent release and severe injury resulting from sudden uncoupling. Although a preferred embodiment has been herein described in order to illustrate for those skilled in the art, the principles upon which the invention rest, it will be understood that some changes and innovations can be made in the illustrated structure without departure from the principles of the invention. Thus, for example, a differently shaped female socket member or adapter can be used and the male plug can also be differently configured. The shape of the cam face 62 need not be precisely like that which is illustrated in the drawings, and the handles or lever arms 36 and 38 need not be configured precisely as shown.

Changes and innovations of the type described are deemed to be nevertheless circumscribed within the spirit and scope of the invention. It is anticipated that the bounds of such spirit and scope will be established by liberally and expansively interpreting the appended claims which define my invention.

What is claimed is:

1. A safe locking quick disconnect coupling comprising:
   a tubular male plug defining an annular groove in the exterior surface thereof;
   a socket telescopingly receiving said plug and defining a pair of opposed apertures on opposite sides of the socket and aligned with said annular groove when said plug is sealingly seated in, and engaged with, said socket;
   means for sealing between the plug and the socket;
   a pair of lever arms including arms disposed on opposite sides of the socket, each of said lever arms having:
   an elongated handle portion;
   a pivot head pivotally connected to said socket adjacent one of said apertures; and a cam portion carried on said pivot head and projecting through the adjacent aperture into camming engagement with said annular groove;

two pairs of lugs secured to said socket on the opposite sides thereof, each lug in each of said pairs including an ear portion, with the ear portions in each lug pair being aligned and having aligned locking pins holes formed therethrough and being positioned on opposite sides of one of said handles when the lever arms are in their locking positions; and a removable locking pin having a first straight leg extending through the aligned pin holes in each pin of aligned ear portions, and having said straight leg extending across one of said elongated handle portions to retain the respective lever arm carrying said one handle portion in close proximity to said socket and said respective lever arm in a locking status, and each of said locking pins further having a bent, angulated second leg having a free end and being of generally W-shaped configuration including two contiguous V-shaped bends each defining an obtuse angle, and each forming a point in said second leg, with said points spaced from each other and located in the midportion of said second leg and being located relatively closer to said first straight leg than the remaining portions of said bent, angulated second leg, said pair of points in said bent, angulated second leg being positioned for each successively contacting at different times, at least one of said ear portions when the respective locking pin is pulled in a direction to extricate said straight leg from aligned locking pin holes whereby a double tactile warning indication is communicated to a person removing said locking pin before said locking pin will release the respective lever arm, said first and second legs being joined through a finger grip loop section at one of the ends of the two legs and having a free end at the opposite end of each of said legs, said legs diverging from each other adjacent said opposite free ends thereof and having said opposed free ends spaced from each other a distance less than the distances said aligned pin holes are spaced inwardly in the respective ear portions in which they are located whereby each ear portion can pass between said free ends to wedgingly bias the legs of the removable locking pin apart from each other.

* * * * *

UNITED STATES PATENT AND TRADEMARK OFFICE
CERTIFICATE OF CORRECTION

PATENT NO. : 4,871,195
DATED : October 3, 1989
INVENTOR(S) : James R. Parrish

It is certified that error appears in the above-identified patent and that said Letters Patent is hereby corrected as shown below:

In the Claims:

In Column 5, line 8, delete "pins" and insert -pin-.
In Column 5, line 13, delete "pin" and insert -pair-.
(2nd occurrence)

Signed and Sealed this

Twenty-first Day of August, 1990

Attest:

HARRY F. MANBECK, JR.

*Attesting Officer*     *Commissioner of Patents and Trademarks*